United States Patent [19]

Couilahn

[11] Patent Number: 4,614,368

[45] Date of Patent: Sep. 30, 1986

[54] LIQUID METAL PIPE JOINT

[75] Inventor: John F. Couilahn, Bridgewater, N.J.

[73] Assignee: General Dynamics Corp./Convair Division, San Diego, Calif.

[21] Appl. No.: 703,143

[22] Filed: Feb. 19, 1985

[51] Int. Cl.$^4$ .................. F16L 55/00; F16J 15/00
[52] U.S. Cl. .................................... 285/10; 285/41; 285/47; 285/64; 277/22; 277/135
[58] Field of Search ................ 285/10, 41, 47, 48, 285/61, 64; 277/22, 27, 135

[56] References Cited

U.S. PATENT DOCUMENTS

| | | | |
|---|---|---|---|
| 1,194,236 | 8/1916 | Richards | 285/61 |
| 2,799,522 | 7/1957 | King et al. | 285/41 |
| 2,984,899 | 5/1961 | Richter et al. | 285/41 |
| 2,992,017 | 7/1961 | Dritz | 285/41 |
| 3,008,735 | 11/1961 | Wijngaarden | 285/61 |
| 3,129,947 | 4/1964 | Streck | 277/22 |
| 3,469,862 | 9/1969 | Conibeer | 285/41 |
| 3,807,772 | 4/1974 | Delisle et al. | 285/41 |
| 3,979,164 | 9/1976 | Kuchnir | 403/28 |
| 4,275,565 | 6/1981 | Beck | 285/47 |
| 4,286,898 | 9/1981 | Stafford | 285/41 |

Primary Examiner—Cornelius J. Husar
Assistant Examiner—Anthony Knight
Attorney, Agent, or Firm—John R. Duncan; Frank D. Gilliam

[57] ABSTRACT

Disclosed is a method and apparatus for forming a liquid tight joint between the ends of conductors (pipes) in a piping system for carrying a liquid metal fluid (LiPb). The ends of the pipes are loosely telescoped to allow for misalignment and then initially cooled by coils to solidify the liquid metal fluid in the annulus between the telescoped ends so that the solidified liquid metal itself seals the joint. Suitably located insulation and cooling fins provide thermal equilibrium for the solidified liquid metal in the annulus to maintain the seal. To disconnect the joint, the joint is heated to liquefy the solidified liquid metal in the annulus so that the ends may be pulled apart.

12 Claims, 3 Drawing Figures

LIQUID METAL PIPE JOINT

BACKGROUND OF THE INVENTION

This invention relates in general to the formation of a joint between pipes or conduits in a piping system for carrying a liquid metal fluid such as LiPb as is specifically directed to a method and apparatus for forming a fluid tight seal in a joint by using the fluid itself to form the seal in lieu of a gasket seal, brazed or weld type joint.

The formation of pipe joints and the apparatus for sealing the joints against leakage has been practiced for many years. The technique for utilizing heating and/or cooling of one of the parts to join pipe sections is shown by way of example in the U.S. Patent to Richter et al., No. 2,984,899 and an expansion lock for transmitting forces between two structural members as they are cooled down utilizing frozen liquid is shown to be old in the U.S. Patent to Kuchnir, No. 3,979,164.

However, it will be apparent for those skilled in the art from the drawings and written description of this invention hereinafter that the prior art does not disclose a pipe joint and the method of forming same in which the liquid metal fluid being carried by the piping system is itself used to seal the pipe joint against leakage. It will be also apparent that the joint of this invention can be made up at a location remote from any operator.

SUMMARY OF THE INVENTION

A method and apparatus for forming a liquid tight joint in a piping system. The ends of the pipes are loosely telescoped together to allow for misalignment and liquid metal fluid carried by the piping system is allowed to enter an annulus formed by the loosely telescoped ends where the fluid is initially cooled by cooling coils to solidify the liquid metal in this annulus so that the solidified metal itself seals the joint. After initial cooling and sealing, suitably located insulation means and cooling fins provide thermal equilibrium for the solidified metal to maintain the seal in the annulus. Means are also provided to slow the flow of the liquid metal fluid in the annulus during initial sealing to allow for sufficient heat transfer and seal formation. To disconnect the joint, heat is applied to liquefy the solidified liquid metal in the annulus so that the ends of the pipes may be pulled apart.

The method can be practiced and the joint made up, sealed and later disconnected from a station remote from an operator.

DETAILED DESCRIPTION

Figure 1:
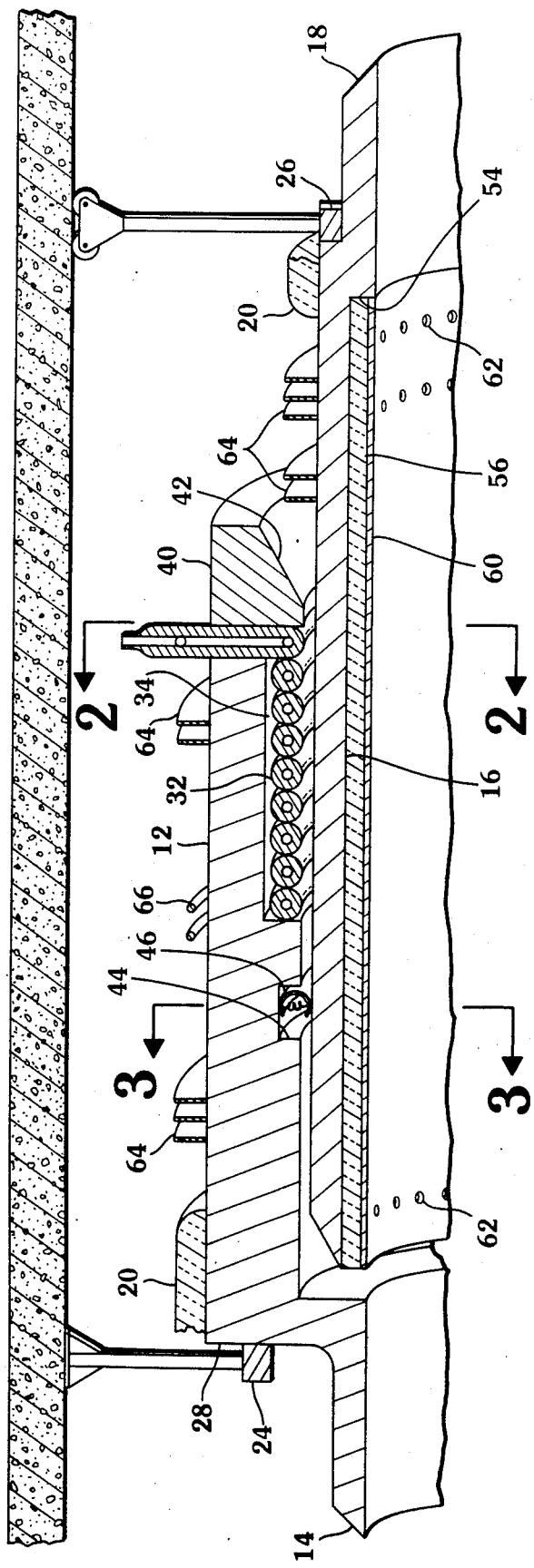
FIG. 1 is a cross sectional view of a pipe joint incorporating this invention.
Figure 2:
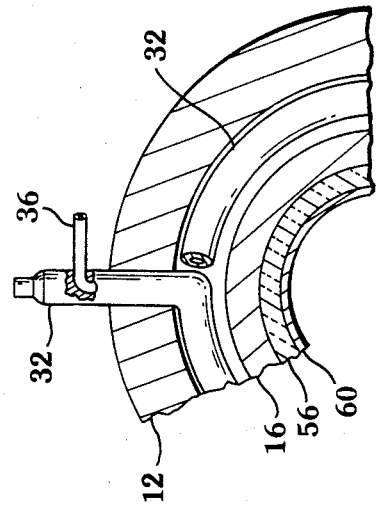
FIG. 2 is a cross sectional view taken along line 2—2 of FIG. 1 illustrating the cooling coils in more detail.
Figure 3:
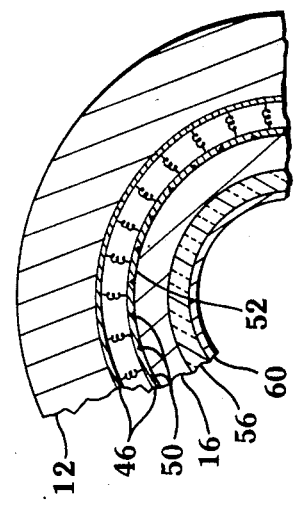
FIG. 3 is a cross sectional view taken along line 3—3 of FIG. 1 to illustrate grooves in the omni-seal.

In the drawings, it can be seen that the pipe joint of this invention comprises two main elements—a first sleeve 12 forming a socket, shown integral with pipe 14 and radially offset, i.e., having a larger inner diameter than the pipe 14 to receive the end section 16 of pipe 18 in telescoping relationship. The end section 16 is integral with pipe 18 and also offset from the pipe 18, but less than the offset of the sleeve 12. Both pipes have external insulation 20 which terminate at the joint and the inner surface of the sleeve 12 and the outer surface of the end section 16 are spaced apart forming an annulus therebetween which is used to compensate for any misalignment of the pipe as they are joined coaxially and to provide a space for the fluid liquid metal to fill to form the seal as will be further described. The end section 16 is longer than the sleeve 12 and thus extends outwardly from the telescoping portions. Inasmuch as liquid metal fluid, such as LiPb, does not adhere to the pipe surfaces in a manner that it will take a tensile load in the joint, restraint is needed to keep the joint from separating due to internal pressure. To accomplish this restraint, axial restraint rings 24 and 26 are used. Ring 24 engages shoulder 28 formed by the offset for the sleeve 12 and is spaced from the outer diameter of pipe 14 so that the sleeve may move to mate with the incoming pipe section 16 due to possible misalignment and is connected to a suitable base such as a building. Ring 26 engages the shoulder formed by the offset in the pipe 18 and is connected to another base.

In the embodiment shown, the first sleeve 12 is thick as compared to the end section 16 and is provided with a plurality of helically wound cooling coils 32 located in an annular recess 34 formed in the inner surface of the sleeve and facing the outer surface of the end section 16 to form a cooling area in the annulus. The cooling coils are formed as a tube 36 within a heat exchanger tube, i.e., the outside tube 32 and are self actuating or of a forced circulating design. A ring 40, forming one wall of the recess wall 34 is either bonded or welded onto the end of the sleeve to allow insertion and removal of the cooling coils and to hold the cooling coils in place against the pressure of the liquid metal fluid in the annulus. The ring 40 also has a conical surface 42 to guide the insertion of the end section 16 into the sleeve 12. Located inwardly of the recess 34 on the side opposite of the ring 40 is a second recess 44 facing the outer surface of the end section 16 to receive a tubular metal omni-seal 46 open to its interior surfaces which engages the outer surface of the end section 16 and seals with internal system pressure applied to the interior surface but relieves pressure to the pipe internally from the annulus between the cooling coils and omni-seal. In the event of a seal failure, this omni-seal will prevent catastrophic failure and limit leakage.

Also, on initial fill of the system, this omni-seal slows the liquid metal flow allowing time for heat transfer and seal formation otherwise the large radial clearance provided by the annulus may allow a rapid stream of liquid metal fluid which does not reside in the cool area long enough to give up its heat and to solidify. To insure that the omni-seal does not inadvertently keep all the liquid metal from reaching the cooling area, small relief grooves 50 are formed in the omni-seal across the sealing face 52. This omni-seal also limits leakage of hot helium circulated in the pipe system to warm up the system prior to the fill of liquid metal fluid in the piping.

As mentioned before, the end section 16 is offset the main bore of pipe 18. This offset provides a recess 54 to receive insulation 56 thus located out of the flow path of the fluid to avoid being a flow restrictor and to minimize erosional forces. This insulation 56 is tubular in form extending the length of the end section and provided with relatively thin sheet metal layer 60 which covers the insulation to prevent erosion of the insulation material. This cover 60 has holes 62 for pressure equalization so that the insulation is not crushed to point of losing its insulating ability.

Thus, with the insulation extending in both directions beyond the cooling area in the annulus as generally defined by the length of the recess 34 and with a suitable number of radially outwardly extending cooling fins 64 located on both the sleeve 12 and the end section 16, it can be appreciated that after initially solidifying the liquid metal via the cooling coils, thermal equilibrium may continually cool the liquid metal into solidification. The length of the area the number of coils the thickness of the insulation and the number of cooling fins being determined by the heat transfer considerations.

From the foregoing, it can be seen that the externally insulated pipes and offset sleeves are brought into telescoping relationship and the cooling coils, the omni-seal and the metal covered insulation suitably positioned. Hot helium is circulated in the pipes to warm up the system prior to the liquid metal fluid fill of the piping. Flowing cooling liquid is circulated through the cooling coils solidifying the liquid metal and forming a tight seal utilizing the liquid metal itself to do this. Once the seal is formed, thermal balance achieved by the fins and the insulation coupled by a long heat flow path (length of recess 34 determining the cooling area) provide continual cooling making continual use of the cooling coils unnecessary. During the initial fill of the system, the omni-seal slows the liquid metal fluid flow allowing time for heat transfer and seal formation.

If disconnection of the joint is desired, heating wires 66 surrounding the recess area of the socket 12 may be used, or alternatively heated fluid may be circulated through the cooling coils to liquefy the sealing material.

Finally, it should be noted that all of the foregoing formation of the joints and its disconnections may be accomplished from a location remote from an operator.

What is claimed is:

1. A liquid metal pipe joint comprising:
   a hollow cylindrical sleeve on the end of one pipe for receiving an end section of another pipe;
   the end section of the second pipe being telescoped in said sleeve end of the size to form an annulus between the inner surface of said sleeve and the outer surface of such end section;
   said sleeve is of a larger diameter than said one pipe to form an offset and said end section is of a larger diameter than said second pipe to form an offset;
   said end section is provided with a layer of insulation within the offset of said end section coextensive with said annulus so as to limit the heat transfer from the end section into the annulus and not form a flow restriction to said liquid metal fluid; and
   means for cooling and solidifying said liquid metal fluid entering said annulus so that the liquid metal itself in its solid state forms the seal to form a liquid tight joint.

2. The joint as claimed in claim 1 wherein said cooling means comprises coils on the inner surface of the sleeve and facing said annulus.

3. The joint as claimed in claim 1 wherein said cooling means further comprises cooling coils located in a recess in said sleeve.

4. A liquid metal pipe joint comprising:
   a hollow cylindrical sleeve on the end of one pipe for receiving an end section of another pip;
   the end section of the second pipe being telescoped in said sleeve and of the size to form an annulus between the inner surface of said sleeve and the outer surface of said sleeve and the outer surface of such end section;
   said pipes carrying liquid metal fluid some of which enters said annulus;
   an omni-seal located on the inner surface of said sleeve and engaging the outer surface of said end section so as to react to fluid entering said annulus to thus form a seal and to react against fluid following out of said annulus toward said second pipe;
   means for cooling and solidifying said liquid metal fluid entering said annulus so that the liquid metal itself in its solid state forms the seal to form a liquid tight joint; and
   grooves on the surface, of said omni-seal engaging said end section to allow liquid metal fluid to enter said annulus yet slow the flow of said fluid for adequate heat transfer to cool and solidify said liquid metal.

5. The joint as claimed in claim 4 wherein further including cooling fins located on the exterior of said sleeve and end section.

6. The joint as claimed in claim 5 further including retaining means at the end of said sleeve and at the end of said end section to hold said joint together.

7. The joint as claimed in claim 6 further including means for heating said joint to liquefy said solidified liquid metal in the annulus to allow disconnection of said joint.

8. In a method of forming a liquid tight joint between metal pipes, the steps comprising:
   forming a sleeve on the end of one pipe;
   forming an end section on another pipe of a greater diameter than said another pipe to form an offset, said end section having a diameter less than the inner diameter of the sleeve, bringing the end section into telescoping relationship with said sleeve forming an annulus between the inner surface of the sleeve and the outer surface of the end section;
   providing a layer of insulation within the inner surface of said offset coextensive with said annulus so as to limit heat transfer from the end section into said annulus;
   flowing fluid through said pipes some of which enters said annulus; and cooling an area of said annulus to solidify said liquid thus utilizing the liquid itself to form a seal.

9. The method as claimed in claim 8 including the further step of slowing the fluid entering the annulus so that there is time for heat transfer and solidification of said fluid entering said annulus.

10. The method as claimed in claim 9 including the step of flowing cooling fluid through coils adjacent said annulus to form said cooling area.

11. The method as claimed in claim 10 including the step of providing said sleeve and end sections with heat radiation means and said end section with insulating means to provide a thermal equilibrium between a liquid metal in said pipes and said sleeve and said end section to maintain the metal in said annulus in a solid state to maintain said seal.

12. The method as claimed in claim 8 additionally comprising the step of providing a seal located on the inner surface of said sleeve and engaging the outer surface of said end section so as to react to fluid entering said annulus to thus form a seal and to react against fluid flowing out of said annulus toward said another pipe.

* * * * *